(12) United States Patent
Goelet

(10) Patent No.: US 9,132,382 B2
(45) Date of Patent: Sep. 15, 2015

(54) SYSTEMS FOR WATER EXTRACTION FROM AIR

(71) Applicant: John Goelet, Washington, DC (US)

(72) Inventor: John Goelet, Washington, DC (US)

(73) Assignee: LTA Corporation, New York, NY (US)

( * ) Notice: Subject to any disclaimer, the term of this patent is extended or adjusted under 35 U.S.C. 154(b) by 0 days.

(21) Appl. No.: 14/257,119

(22) Filed: Apr. 21, 2014

(65) Prior Publication Data

US 2014/0224128 A1    Aug. 14, 2014

Related U.S. Application Data

(62) Division of application No. 13/365,705, filed on Feb. 3, 2012, now Pat. No. 8,747,530.

(60) Provisional application No. 61/442,908, filed on Feb. 15, 2011.

(51) Int. Cl.
*B01D 53/26* (2006.01)
*B01D 5/00* (2006.01)
*E03B 3/28* (2006.01)

(52) U.S. Cl.
CPC ............... *B01D 53/261* (2013.01); *B01D 5/00* (2013.01); *E03B 3/28* (2013.01); *B01D 2259/4566* (2013.01)

(58) Field of Classification Search
None
See application file for complete search history.

(56) References Cited

U.S. PATENT DOCUMENTS

| | | | |
|---|---|---|---|
| 1,261,005 A | 4/1918 | Barstow et al. | |
| 3,345,272 A | 10/1967 | Collins | |
| 3,522,151 A | 7/1970 | Dismore | |
| 3,563,860 A | 2/1971 | Henderyckx | |
| 3,637,465 A | 1/1972 | Wilson | |
| 4,915,792 A | 4/1990 | Zeilon | |
| 5,857,344 A * | 1/1999 | Rosenthal | 62/93 |
| 6,156,102 A | 12/2000 | Conrad et al. | |
| 6,230,503 B1 * | 5/2001 | Spletzer | 62/93 |
| 6,302,944 B1 | 10/2001 | Hoenig | |

(Continued)

FOREIGN PATENT DOCUMENTS

| | | |
|---|---|---|
| DE | 23 48 085 A1 | 4/1975 |
| EP | 0 325 452 A1 | 7/1989 |

(Continued)

OTHER PUBLICATIONS

Sunil K. Vaidya, "Oman plans fog-harvesting project to ease water shortage," [online], Jun. 23, 2010, 2 pages, retrieved from the Internet: URL: http://gulfnews.com/news/gulf/oman/oman-plans-fog-harvesting-project-to-ease-water-shortage-1.644770.

(Continued)

*Primary Examiner* — Duane Smith
*Assistant Examiner* — Phillip Shao
(74) *Attorney, Agent, or Firm* — Finnegan, Henderson, Farabow, Garrett & Dunner LLP

(57) ABSTRACT

A system for water extraction from air is provided. The system includes a housing having a plurality of openings allowing an air flow to enter into an inner space defined by the housing. The system also includes a sponge disposed within the inner space defined by the housing. The sponge includes a water absorbing/adsorbing material for absorbing/adsorbing water vapor from the air flow. The system further includes a presser disposed above the sponge and configured to compress the sponge to discharge water from the sponge.

20 Claims, 16 Drawing Sheets

(56) References Cited

U.S. PATENT DOCUMENTS

| | | |
|---|---|---|
| 6,336,957 B1 | 1/2002 | Tsymerman |
| 6,360,549 B1 | 3/2002 | Spletzer et al. |
| 6,383,727 B1 | 5/2002 | Twist et al. |
| 6,393,719 B1 | 5/2002 | Stipp |
| 6,453,684 B1 | 9/2002 | Spletzer et al. |
| 6,499,309 B1 | 12/2002 | Yeh |
| 6,511,525 B2 | 1/2003 | Spletzer et al. |
| 6,574,979 B2 | 6/2003 | Faqih |
| 6,644,060 B1 | 11/2003 | Dagan |
| 6,670,304 B2 | 12/2003 | Chang |
| 6,868,690 B2 | 3/2005 | Faqih |
| 6,910,339 B2 | 6/2005 | Laine et al. |
| 6,955,715 B1 | 10/2005 | Tittle |
| 6,960,243 B1 | 11/2005 | Smith et al. |
| 7,000,410 B2 | 2/2006 | Hutchinson |
| 7,043,934 B2 | 5/2006 | Radermacher et al. |
| 7,251,945 B2 | 8/2007 | Tongue |
| 7,306,654 B2 | 12/2007 | King et al. |
| 7,384,454 B2 | 6/2008 | Tongue |
| D577,100 S | 9/2008 | Brown et al. |
| 7,478,535 B2 | 1/2009 | Turner, Jr. |
| 7,601,208 B2 | 10/2009 | Tongue |
| 7,722,706 B2 | 5/2010 | Thielow |
| 7,759,275 B2 | 7/2010 | Birbara et al. |
| 7,760,438 B1 | 7/2010 | Suiter |
| 2002/0189448 A1* | 12/2002 | Spletzer et al. ............ 95/121 |
| 2008/0178625 A1* | 7/2008 | Thompson et al. ......... 62/273 |

FOREIGN PATENT DOCUMENTS

| | | |
|---|---|---|
| FR | 2 813 663 A1 | 3/2002 |
| FR | 2 815 336 A1 | 4/2002 |
| FR | 2 853 895 A1 | 10/2004 |
| FR | 2 896 495 A1 | 7/2007 |
| GB | 1 577 488 | 10/1980 |
| GB | 2 447 411 A | 9/2008 |
| WO | WO 96/20897 | 7/1996 |
| WO | WO 98/58217 | 12/1998 |
| WO | WO 01/36885 | 5/2001 |

OTHER PUBLICATIONS

A portion of a draft patent application believed to have been filed in the French Patent Office on or about May 17, 2010 (7 pages).

International Search Report and Written Opinion mailed Jul. 26, 2012 in counterpart international application No. PCT/US2012/023954 (14 pages).

International Preliminary Report on Patentability dated Aug. 21, 2013 in counterpart international application No. PCT/US2012/023954 (8 pages).

* cited by examiner

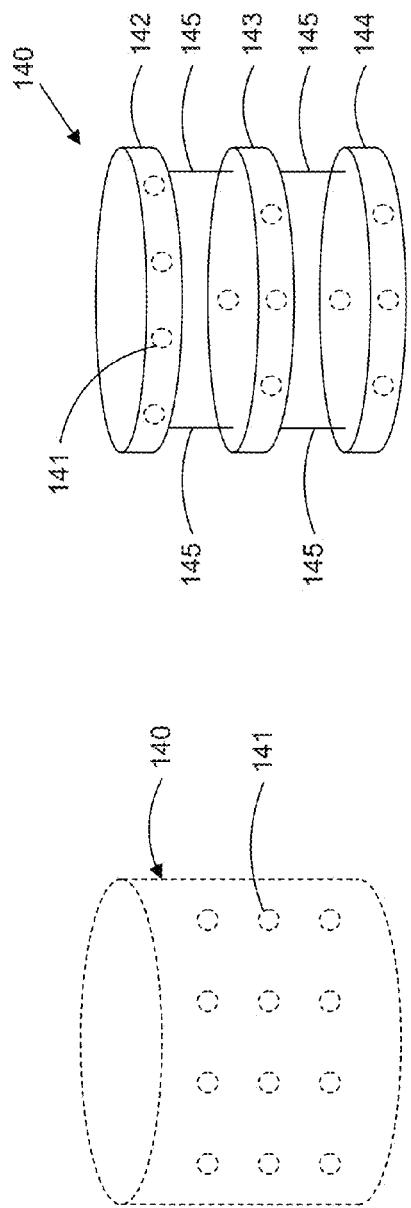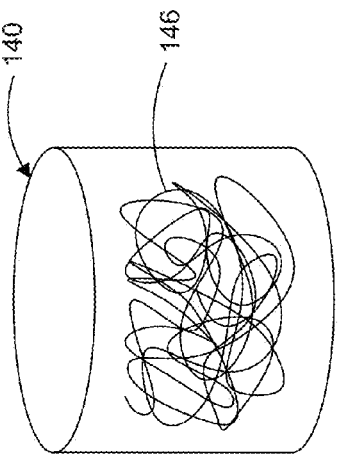

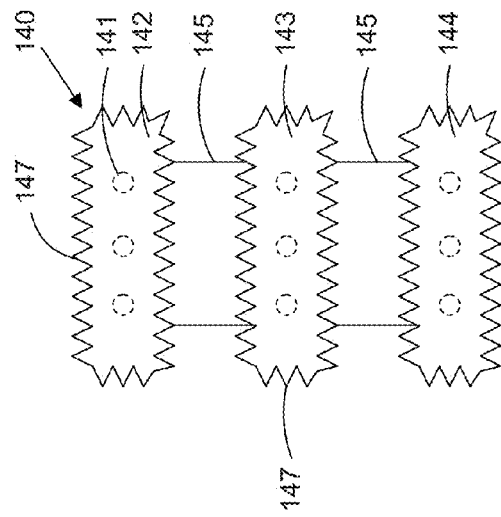
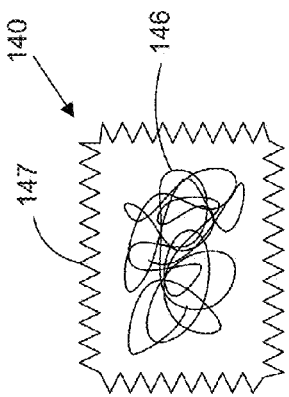
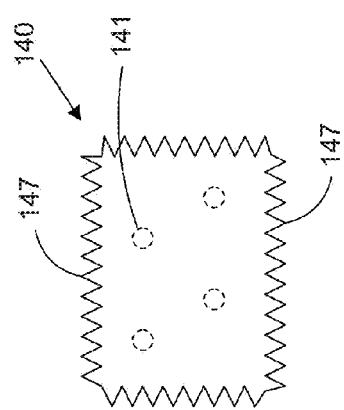

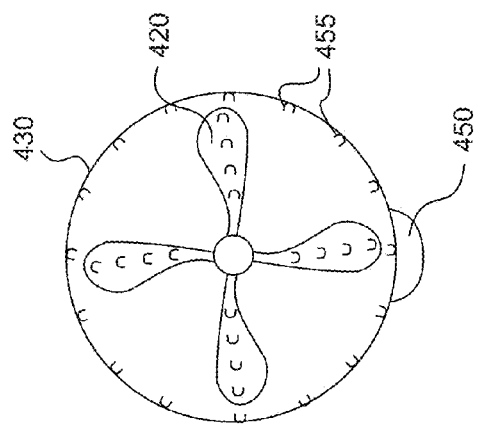
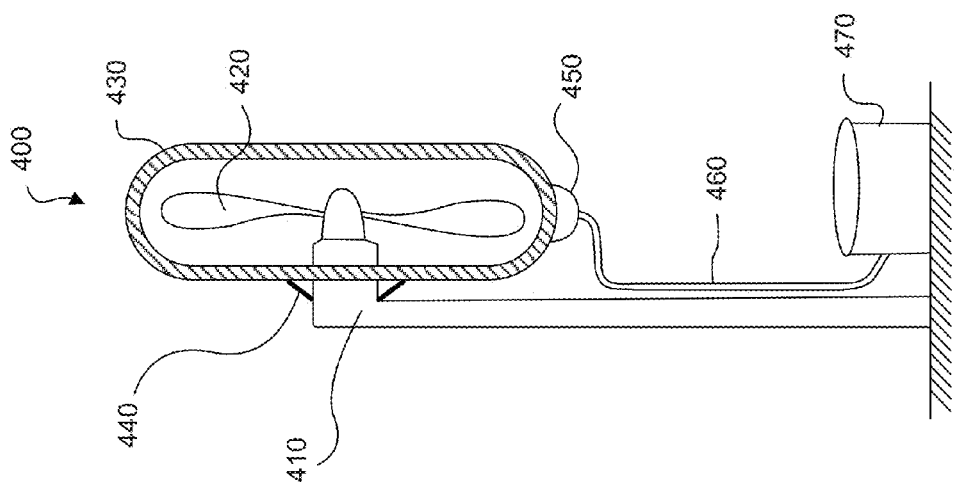

SYSTEMS FOR WATER EXTRACTION FROM AIR

PRIORITY

This is a divisional of U.S. patent application Ser. No. 13/365,705, filed on Feb. 3, 2012 (now allowed), which claims the benefit of priority of U.S. Provisional Application No. 61/442,908, filed Feb. 15, 2011, entitled "SYSTEMS FOR WATER EXTRACTION FROM AIR." The entire contents of all of the above-reference applications are expressly incorporated herein by reference.

TECHNICAL FIELD

The present disclosure relates generally to systems for water collection and, more particularly, to systems for water extraction from air.

BACKGROUND

As the global population expands rapidly, the demand for freshwater and potable water is increasing daily at a fast rate. Natural freshwater resources, such as lakes and rivers, however, are diminishing due to destructive human activities and pollution. Furthermore, the amount of rainfall in many areas has been drastically reduced due to various influences (e.g., global warming).

One possible solution to resolve the problem of diminishing natural freshwater resources is to produce freshwater from the oceans. Various desalinization technologies have been developed to produce freshwater from sea water. However, most of these technologies are bulky, energy consuming, and expensive, and therefore, are not generally affordable to many poor countries or individuals.

Water almost always exists in the air in the form of water vapor. In some humid regions, such as regions near oceans, humid air may contain a significant amount of water vapor. Various technologies have been developed to extract water from air. Many such technologies, however, require a condenser for cooling the air in order to extract water from the air. Some technologies use particular solutions to absorb water from air without requiring a condenser, but require a regenerative process (e.g., by heating) to separate the extracted water from the solutions. These prior art technologies are complex, energy consuming, and expensive. Therefore, the prior art technologies may not be affordable to people who have limited access to energy and financial resources, such as people in poor countries. Also, systems built with these prior art technologies may not be portable.

The present disclosure is directed toward improvements in existing technologies for extracting water from air.

SUMMARY

In one exemplary embodiment, the present disclosure is directed to a system for water extraction from air. The system includes a housing having a plurality of openings allowing an air flow to enter into an inner space defined by the housing. The system also includes a sponge disposed within the inner space defined by the housing. The sponge includes a water absorbing/adsorbing material for absorbing/adsorbing water vapor from the air flow. The system further includes a presser disposed above the sponge and configured to compress the sponge to discharge water from the sponge.

In another exemplary embodiment, the present disclosure is directed to a system for water extraction from air. The system includes a housing having two ends with one of the two ends serving as an air inlet allowing an air flow to enter into an inner space defined by the housing, and the other one of the two ends serving as an air outlet allowing the air flow to exit the housing. The system also includes a sponge disposed within the inner space defined by the housing. The sponge includes a water absorbing/adsorbing material for absorbing/adsorbing water vapor from the air flow. The system further includes a presser disposed above the sponge and configured to compress the sponge to discharge water from the sponge.

In yet another exemplary embodiment, the present disclosure is directed to a system for water extraction from air. The system includes a plurality of rotatable blades having surfaces that include a water absorbing/adsorbing material for absorbing/adsorbing water vapor from an air flow. The system also includes a ring shell structure disposed around the blades and configured to capture water droplets shed from the surfaces of the blades during rotation.

BRIEF DESCRIPTION OF THE DRAWINGS

FIG. 6A illustrates an exemplary sponge consistent with the disclosed embodiments;

FIG. 6B illustrates an exemplary sponge consistent with the disclosed embodiments;

FIG. 6C illustrates an exemplary sponge consistent with the disclosed embodiments;

FIG. 7A illustrates an exemplary sponge consistent with the disclosed embodiments;

FIG. 7B illustrates an exemplary sponge consistent with the disclosed embodiments;

FIG. 7C illustrates an exemplary sponge consistent with the disclosed embodiments;

FIG. 15A illustrates an exemplary system for water extraction from air consistent with the disclosed embodiments;

FIG. 15B illustrates a front view of a portion of the system illustrated in FIG. 15A consistent with the disclosed embodiments.

DETAILED DESCRIPTION

Figure 1:
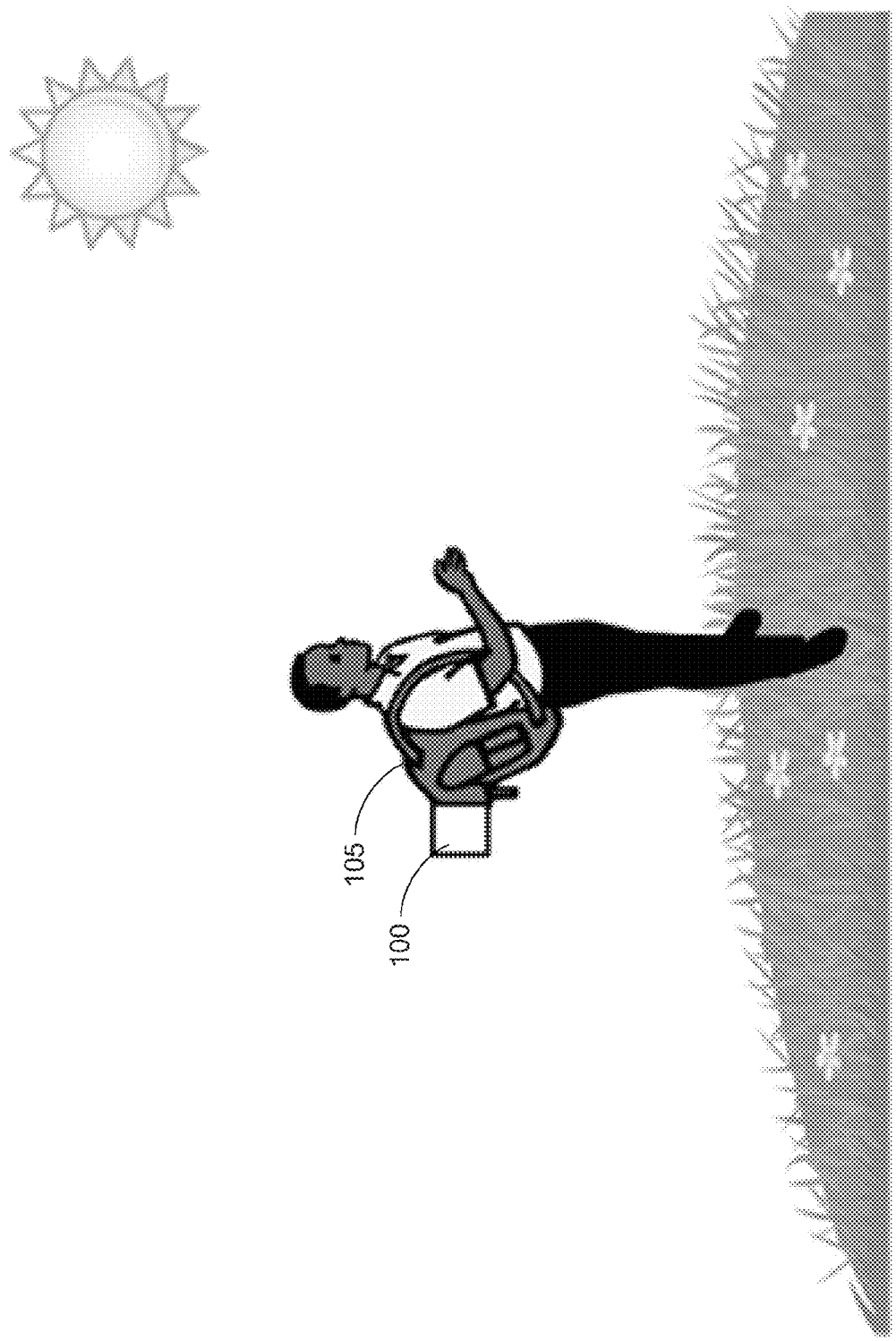
FIG. 1 illustrates an exemplary application of a system for water extraction from air consistent with the disclosed embodiments.

FIG. 1 illustrates an exemplary application of a system for water extraction from air consistent with the disclosed embodiments. In this exemplary application, a system 100 for extracting water from air may be a portable device that can be carried by an individual, such as a hiker, a biker, a traveler, or a soldier. System 100 may be carried by the individual by hand, or may be attached to an article carried by the individual, such as a backpack 105. System 100 may also be carried by an automobile, a bicycle, a ship, or any other moving vehicle. For example, system 100 may be attached to a portion of a bicycle. In some embodiments the attachment of system 100 to the vehicle may be permanent. In other embodiments, the attachment may be temporary, such that system 100 may be readily detached from the vehicle, e.g., for cleaning and/or attachment to another vehicle.

Figure 2:
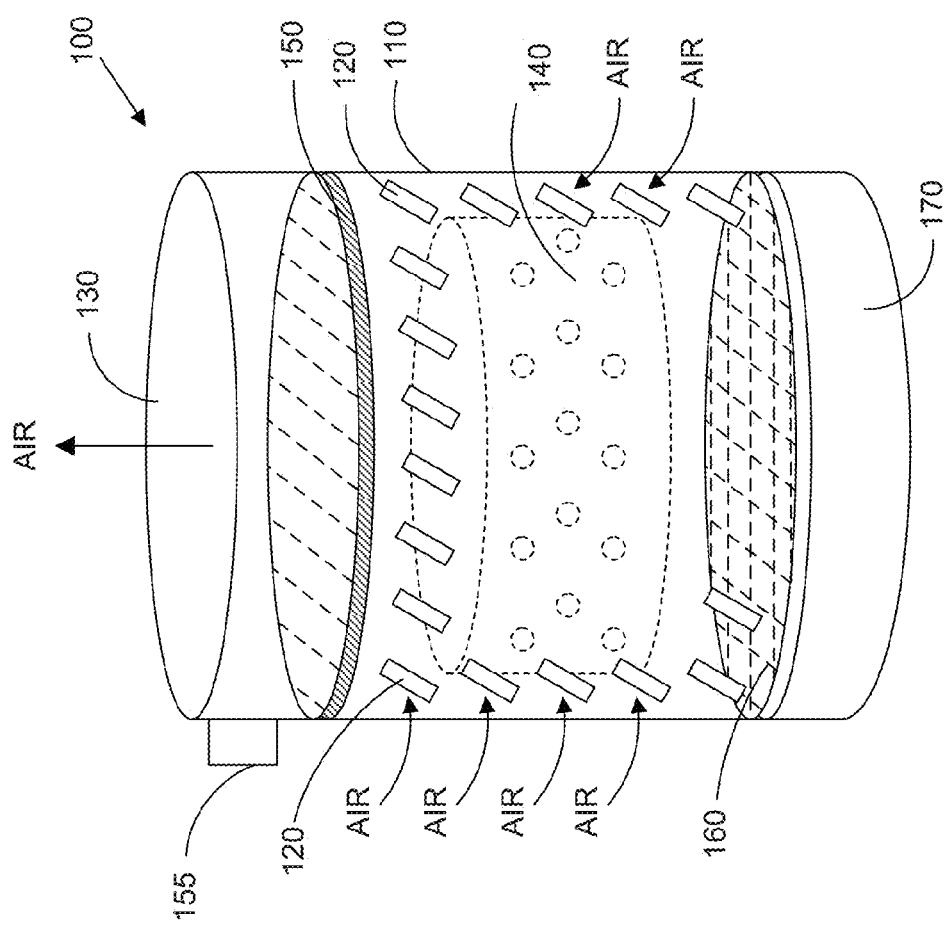
FIG. 2 illustrates an exemplary system for water extraction from air consistent with the disclosed embodiments.

FIG. 2 illustrates an exemplary embodiment of system 100 for water extraction from air. System 100 may have a canister type structure. System 100 may include a housing 110 forming the canister type structure. Housing 110 may be any suitable shape, for example, a cylinder, a cube, a hexagonal prism, a triangular prism, etc. For illustration and discussion purpose, housing 110 is shown having a cylindrical shape.

Housing 110 may be made of any suitable materials, such as steel, aluminum, alloys, composites, or plastics. Housing 110 may include a thermal insulation design, which may maintain the inner space defined by housing 110 at a relatively low temperature, or which may prevent the temperature inside the space defined by housing 110 from increasing to adversely affect the water extraction efficiency. For example, the outer surface of housing 110 may be made of, or coated with, a heat and/or sunlight reflective material, which may reflect heat and/or sunlight away from housing 110. Such material may include a reflective paint, a ceramic coating, a reflective metallic material such as aluminum, etc. Housing 110 may also include a heat insulation material between the inner and outer surfaces of housing 110, such as ceramic, foam, fiberglass, carbon fiber, etc. The inner surface of housing 110 may also include a suitable material that may help maintain a low temperature within the inner space defined by housing 110. For example, the inner surface of housing 110 may include one or more materials having a low thermal conductivity, such as ceramics, foams, carbon fiber, etc.

Housing 110 may include a plurality of openings 120, such as slots or holes on the body of housing 110. Openings 120 may serve as air inlets by allowing air to flow into the inside space defined by housing 110. Openings 120 may be distributed in a middle region of housing 110. Openings 120 may take any suitable shape, such as rectangular, square, triangular, circular, hexagonal, star-shaped, etc. Openings 120 may be evenly or randomly distributed on housing 110. The number, shape, size, and orientation of openings 120 may be determined in order to provide a desired amount and direction of air flow for the housing shape.

System 100 may include an air outlet 130 at a top end of housing 110. In some embodiments, air entering housing 110 through openings 120 may exit housing 110 from air outlet 130. Air outlet 130 may be covered by a removable end cap (not shown) when system 100 is not in operation. In some embodiments, system 100 may be provided without a separate air outlet at the top end of housing 110. For example, in certain embodiments, system 100 may be configured such that air flowing into system 100 through some of openings 120 may exit system 100 from other openings 120. For instance, in some embodiments, system 100 may be configured such that atmospheric wind blows in openings 120 on one side of housing 110, and exits from openings 120 on the opposite side of housing 110.

System 100 may include a sponge 140 disposed inside system 100 in the space defined by housing 110. The term "sponge" used in this application represents any device having a suitable structure that is readily compressible and expandable (e.g., in the manner of an ordinary household sponge). Such devices may include a porous structure and/or a resilient and layered structure, which may be compressed to reduce volume, and then expand to substantially restore their original shapes and volumes when the compression force is released.

Sponge 140 may include a water absorbing/adsorbing material for absorbing/adsorbing water vapor from the air flow. In some embodiments, sponge 140 may be coated with the water absorbing/adsorbing material. In some embodiments, sponge 140 may be wholly or partially made of the water absorbing/adsorbing material. The water absorbing/adsorbing material may include any suitable material, for example, tertiary amines, polyethylene glycols, and/or hydrophobic activated carbon.

Sponge 140 may be configured to temporarily hold the extracted water therein. Sponge 140 may be compressible. Sponge 140 may be configured to, when compressed, reduce its volume, and thereby discharge water held therein. After water is discharged and the compression force released, sponge 140 may substantially restore its pre-compression volume and shape. The size of sponge 140 may be determined such that, even during the compression process, sponge 140 may avoid contact with the inner surface of housing 110. In other words, a space is always maintained between sponge 140 and the inner surface of housing 110, despite any outward (e.g., radial) expansion of sponge 140 when compressed. The space may prevent water from leaking out of housing 110, which could occur if sponge 140 were to make contact with a portion of housing 110 having openings 120 therein. In some embodiments, openings 120 may be positioned such that they are of a certain distance above the bottom of sponge 140 to prevent water leakage through openings 120 when sponge 140 is compressed.

System 100 may include a presser 150 disposed inside system 100. Presser 150 may be disposed above sponge 140 and adjacent air outlet 130. Presser 150 may be used to compress sponge 140 in order to discharge water from sponge 140. Presser 150 may take any suitable shape that fits the shape of housing 110. For example, presser 150 may be a round plate when housing 110 is in a cylindrical shape. Presser 150 may be movable, for example, by actuation of a presser driver 155. In some embodiments, presser driver 155 may be mechanically linked to presser 150, and may be disposed adjacent air outlet 130 on an outer surface of housing 110. In some embodiments, presser driver 155 may be slidable along a guiderail (not shown) located on the outer surface of housing 110. A user may slide presser driver 155, causing presser 150 to move towards sponge 140, and to compress sponge 140 to discharge water. After the water is discharged from sponge 140, the user may slide presser driver 155 back to its original position adjacent air outlet 130, which in turn may bring back presser 150 to its original position adjacent air outlet 130. When presser 150 is brought to its original position, sponge 140 may expand to substantially restore its pre-compression volume and shape.

System 100 may include a water filter 160 disposed at a bottom end of housing 110. Water filter 160 may be disposed below sponge 140 and, in some embodiments, may provide a support for sponge 140. For example, in certain embodiments, sponge 140 may rest on water filter 160. Water filter 160 may include any suitable water filtering medium for cleaning water to produce potable water. When water is discharged from sponge 140, water may be filtered by water filter 160.

System 100 may also include a water tank 170 located at the bottom end of housing 110 below water filter 160 for storing water after water discharged from sponge 140 is cleaned by water filter 160. In some embodiments, water tank 170 may be removable from housing 110. For example, water tank 170 may be a threaded cap attached to housing 110 via threads. Alternatively, or additionally, water tank 170 may be attached to housing 110 via any other removable means, such as screws, clips, friction-fit, etc. The user may remove water tank 170 to access water stored therein, or to clean water tank 170 periodically. In another embodiment, water tank 170 may be an integral part of housing 110, and may not be removable from housing 110. Water tank 170 may include a valve (not shown) near the bottom position which may be opened to allow water to exit water tank 170.

Figure 3:
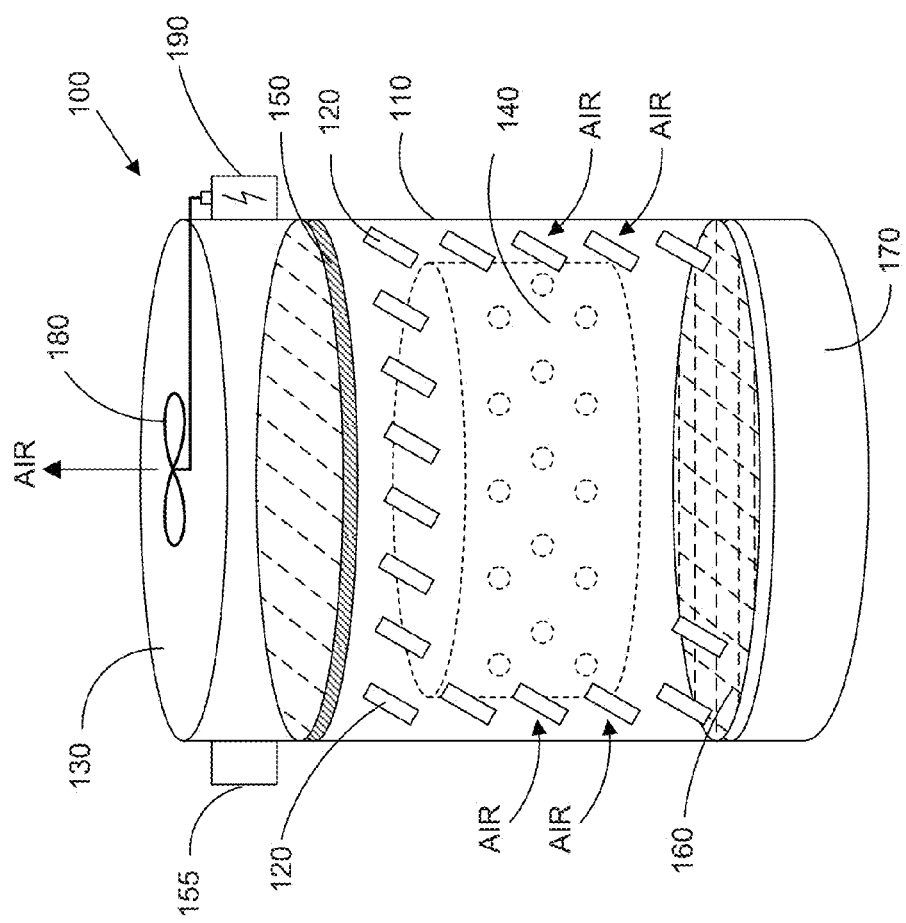
FIG. 3 illustrates an exemplary system for water extraction from air consistent with the disclosed embodiments.

FIG. 3 illustrates another exemplary system 101 for water extraction from air. System 101 may include elements that are similar to those included in system 100, such as housing 110, openings 120, air outlet 130, sponge 140, presser 150, water filter 160, and water tank 170. Therefore, the detailed descriptions of these similar elements are not repeated.

While, in some embodiments, presser driver 155 may be a mechanical driver utilizing human power (as shown and described with regard to system 100), in some embodiments, presser driver 155 may be an electro-mechanical driver utilizing electrical power, as shown and described with regard to system 101. For example, in some embodiments, presser driver 155 may be powered by a battery 190. Presser driver 155 may include a motor (not shown) or any suitable driving device for driving presser 150. Presser driver 155 may be linked with presser 150 via any suitable linking mechanism, such as a chain, a gear, or a rod. When the electrical power is supplied from battery 190 to the motor of presser driver 155, presser driver 155 may drive presser 150 to move towards filter 160 to compress sponge 140, or may drive presser 150 to move towards outlet 130.

Battery 190 may be located at any suitable location in system 101. For example, battery 190 may be attached to housing 110 adjacent air outlet 130. In some embodiments, battery 190 may be a component separate from housing 110. For example, in some embodiments, battery 190 may be attached to housing 110 via an umbilical-type electrical connection.

As shown in FIG. 3, system 101 may also include a fan 180 located adjacent outlet 130. Fan 180 may be attached to housing 110 via any suitable supports (not shown). When electrical power is supplied from battery 190 to fan 180, fan 180 may rotate, causing an air flow from openings 120 to air outlet 130, thereby increasing the overall air flow throughout system 101. Increased air flow through sponge 140 may improve water extraction efficiency.

Figure 4:
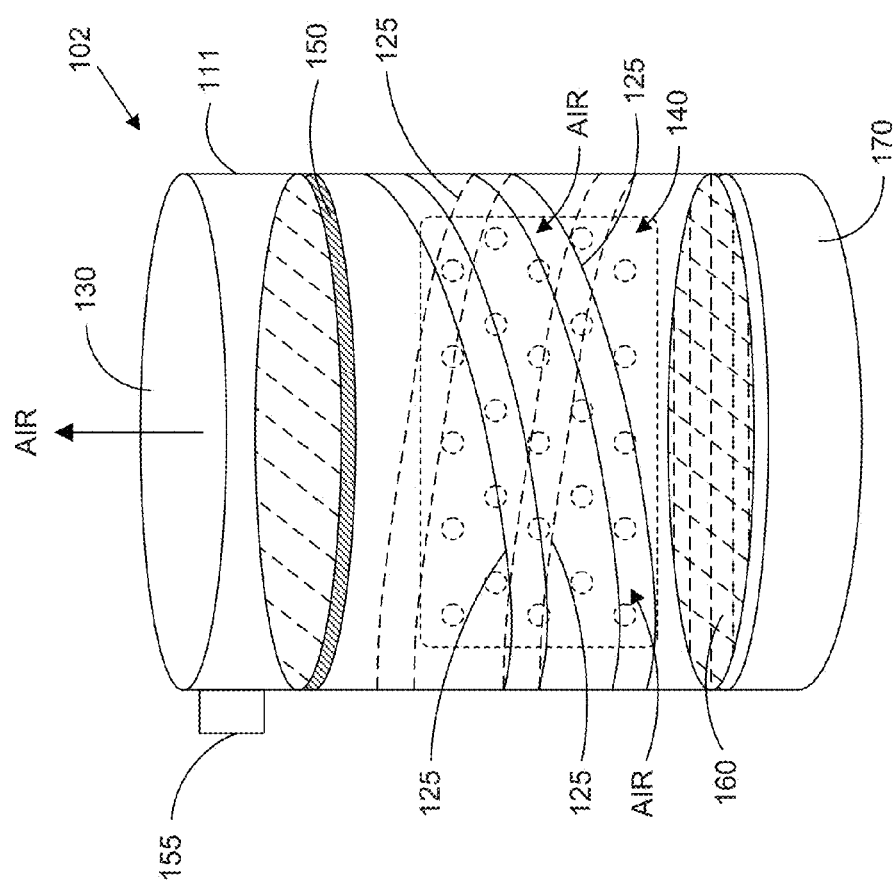
FIG. 4 illustrates an exemplary system for water extraction from air consistent with the disclosed embodiments.

FIG. 4 illustrates an exemplary system 102 for water extraction from air consistent with the disclosed embodiments. System 102 may include elements similar to those included in system 100 and/or system 101, such as air outlet 130, sponge 140, presser 150, presser driver 155, water filter 160, and water tank 170. Although not shown in FIG. 4, system 102 may also include fan 180 and battery 190 as similarly included in system 101. Compared to system 100 or 101, system 102 may include a different housing 111. Housing 111 may include one or more slots provided as spiral openings 125 that allow an air flow to enter the inner space defined by housing 111. In some embodiments, spiral openings 125 may be continuous slots around the body of housing 111. Although two separate spiral openings 125 are shown in FIG. 4, housing 111 may include any suitable number of spiral openings 125 to ensure adequate air flow to sponge 140 for water extraction. In some embodiments, these spiral openings 125 may intersect with one another. One skilled in the art will appreciate that any other suitable styles may be used for the spiral openings. For example, while continuous spiral openings are shown and discussed herein, discrete openings distributed on housing 111 may alternatively, or additionally, be provided.

Air flowing into spiral openings 125 may exit from air outlet 130. One skilled in the art will appreciate that air flowing into system 102 through one spiral opening 125 may exit system 102 from another spiral opening 125 located on an opposite surface of housing 111. Thus, in some embodiments, air outlet 130 may be omitted from system 102. Similar to housing 110, housing 111 may include a thermal insulation design, which may maintain the inner space defined by housing 111 at a relatively low temperature, or which may prevent the temperature inside the space defined by housing 111 from increasing to adversely affect the water extraction efficiency. For example, the outer surface of housing 111 may be coated with a highly reflective material, which may reflect heat away from housing 111. The inner surface of housing 111 may also include a suitable material that may help maintain a low temperature within the inner space defined by housing 111. Further details about exemplary thermal regulation features are discussed above.

Figure 5B:
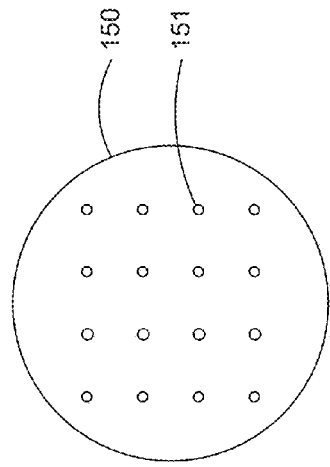
FIG. 5B illustrates an exemplary presser consistent with the disclosed embodiments.
Figure 5C:
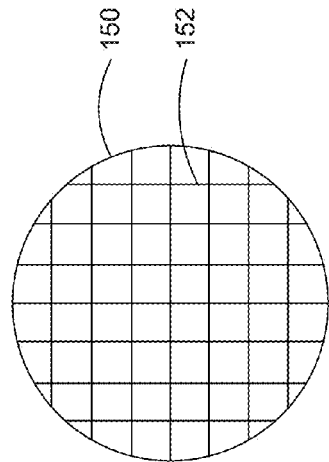
FIG. 5C illustrates an exemplary presser consistent with the disclosed embodiments.
Figure 5A:
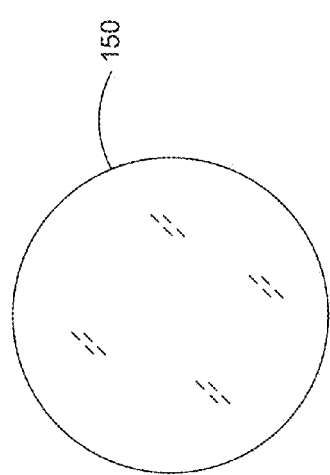
FIG. 5A illustrates an exemplary presser consistent with the disclosed embodiments.

FIGS. 5A-5C illustrate exemplary designs of presser 150 consistent with the disclosed embodiments. Presser 150 is shown in a round shape in FIGS. 5A-5C, which may be employed with a cylindrical housing 110 or 111. As shown in FIG. 5A, in some embodiments, presser 150 may be a solid plate. A solid plate presser structure, such as shown in FIG. 5A, may be employed in embodiments, such as systems 100 and 102, where air entering from some openings located on the housing may exit from other openings located on the housing, rather than from air outlet 130.

As shown in FIG. 5B, in another embodiment, presser 150 may have a plate structure having a plurality of openings 151. The number, distribution, and shape of openings 151 may be suitably designed such that presser 150 does not block air flow from openings 120 or spiral openings 125 to air outlet 130.

As shown in FIG. 5C, presser 150 may have a screen shape structure having a web 152. Web 152 may allow free air flow from openings 120 or spiral openings 125 to air outlet 130. Web 152 may be designed strong for compressing sponge 140. One skilled in the art will appreciate that other suitable presser configurations may be employed in systems 100, 101, and 102.

FIGS. 6A-6C illustrate exemplary designs of sponge 140 consistent with the disclosed embodiments. As shown in FIG. 6A, sponge 140 may be in a cylindrical shape, having a plurality of pores 141 evenly or randomly distributed within the structure. Sponge 140 may be made of any suitable materials, such as polymer, paper, cotton fabric, etc. Sponge 140 may include a water absorbing/adsorbing material. In some embodiments, sponge 140 may be coated with the water absorbing/adsorbing material. In some embodiments, sponge 140 may be wholly or partially made of the water absorbing/adsorbing material. The water absorbing/adsorbing material may include any suitable material, for example, tertiary amines, polyethylene glycols, and/or hydrophobic activated carbons. The water absorbing/adsorbing material may enable sponge 140 to extract water vapor from an air flow passing over the surface and/or through sponge 140. Water extracted from air may be held within sponge 140. When compressed, the volume of sponge 140 may be reduced, causing the discharge of water held therein. When the compression force is released, sponge 140 may restore its pre-compression volume and shape due to the resilience of its structure.

In some embodiments, sponge 140 may have a layered structure connected through links 145, as shown in FIG. 6B. Sponge 140 shown in FIG. 6B may include a plurality of layers 142, 143, and 144. Links 145 may provide support to the layers. Links 145 may also be elastic or resilient so that they do not severely interfere with the compression of sponge 140. When the compression force is released, elastic links 145 may help sponge 140 to restore the pre-compression volume and shape of sponge 140.

Although three layers are shown in FIG. 6B, any suitable number of layers may be used. In some embodiments, one or more of layers 143, 143, and 144 may be in the form of a block structure, similar to the structure shown in FIG. 6A.

In yet another embodiment shown in FIG. 6C, sponge 140 may include a block structure having a body filled with a plurality of fibers 146. Fibers 146 may be organized in a regular pattern, or may be disposed within the body of sponge 140 randomly. Fibers 146 may be resilient, which may help sponge 140 in the compression and expansion processes. Fibers 146 may include a water absorbing/adsorbing material. In some embodiments, fibers 146 may be coated with the water absorbing/adsorbing material. In other embodiments, fibers 146 may be wholly or partially made of the water absorbing/adsorbing material. The water absorbing/adsorbing material may include any suitable material, for example, tertiary amines, polyethylene glycols, and/or hydrophobic activated carbons. Water extracted from air may attach to fibers 146 and be temporarily held within sponge 140.

FIGS. 7A-7C illustrate cross-sectional views of exemplary sponge designs consistent with the disclosed embodiments. These designs correspond to FIGS. 6A-6C, except that the surfaces of sponge 140 include a ribbed, corrugated, or ridged surface 147. Surface 147 may be coated with or made of, the same water absorbing/adsorbing material used for other parts of sponge 140. Thus, surface 147 may increase the overall surface area exposure to the air flow, thereby increasing the water extraction efficiency.

Figure 8:
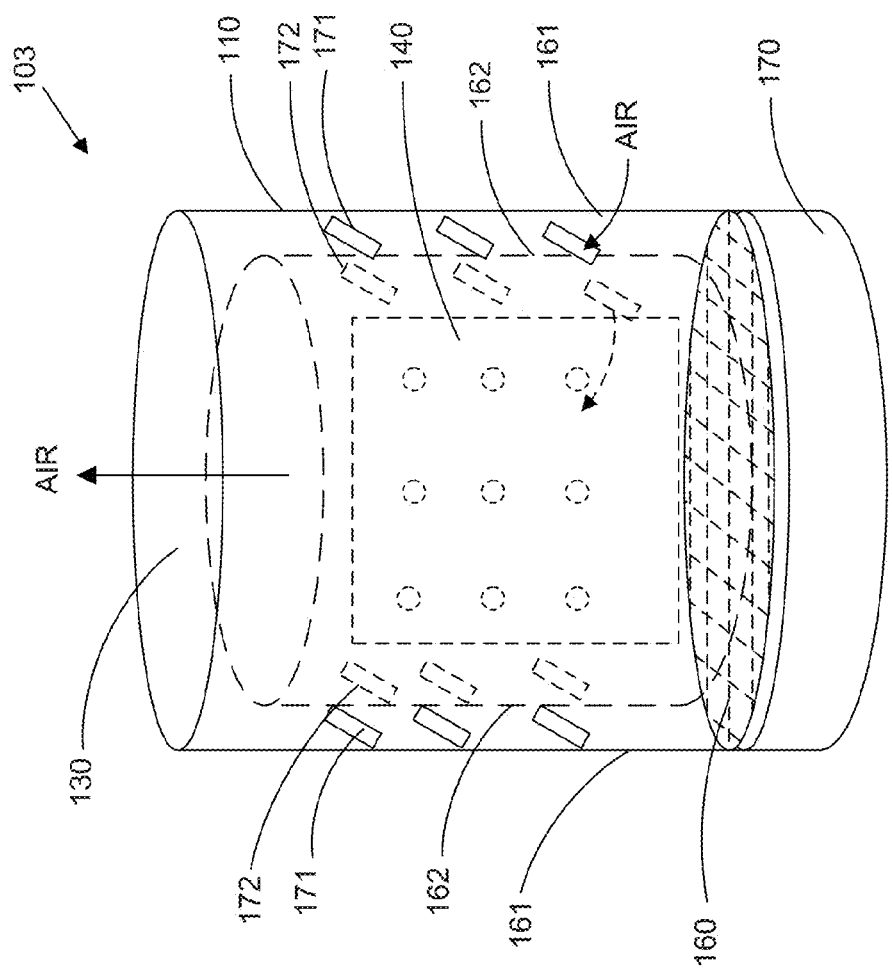
FIG. 8 illustrates an exemplary system for water extraction from air consistent with the disclosed embodiments.

FIG. 8 illustrates an exemplary system 103 for water extraction from air consistent with the disclosed embodiments. System 103 may include similar elements as systems 100, 101, and 102. For simplicity, some elements such as presser 150, presser driver 155, fan 180, and battery 190 are not shown in FIG. 8, although these components may be included in system 103. FIG. 8 shows a double-wall structure which may be employed to housing 110 or housing 111. For purposes of illustration, the double-wall structure shown in FIG. 8 is depicted as implemented in housing 110.

As shown in FIG. 8, housing 110 may include an outer wall 161 and an inner wall 162. A space may be maintained between outer wall 161 and inner wall 162. Sponge 140 may be disposed within a space defined by inner wall 162. Housing 110 may include a plurality of openings 171 on outer wall 161, and a plurality of openings 172 on inner wall 162. Openings 171 and 172 may be through-holes or slots, and may be similar to openings 120 shown in FIG. 2, or spiral openings 125 shown in FIG. 4. Inner wall 162 may limit the expansion of sponge 140 during compression, such that sponge 140 does not touch outer wall 161 when compressed, thereby preventing water from leaking through openings 171 on outer wall 161.

Openings 171 and 172 may serve as air inlets, allowing air to flow into and out of sponge 140. Openings 172 on inner wall 162 may also allow water discharged from sponge 140 during the compression process to flow into the space between inner wall 162 and outer wall 161. Water filter 160 may be disposed at the bottom of inner wall 162, and may clean water discharged from sponge 140. In some embodiments, inner wall 162 and sponge 140 may rest on water filter 160. Water filter 160 may extend to cover the space between inner wall 162 and outer wall 161. Thus, water flowing out of inner wall 162 into the space between inner wall 162 and outer wall 161 may also be filtered by water filter 160 before entering into water tank 170.

Figure 9:
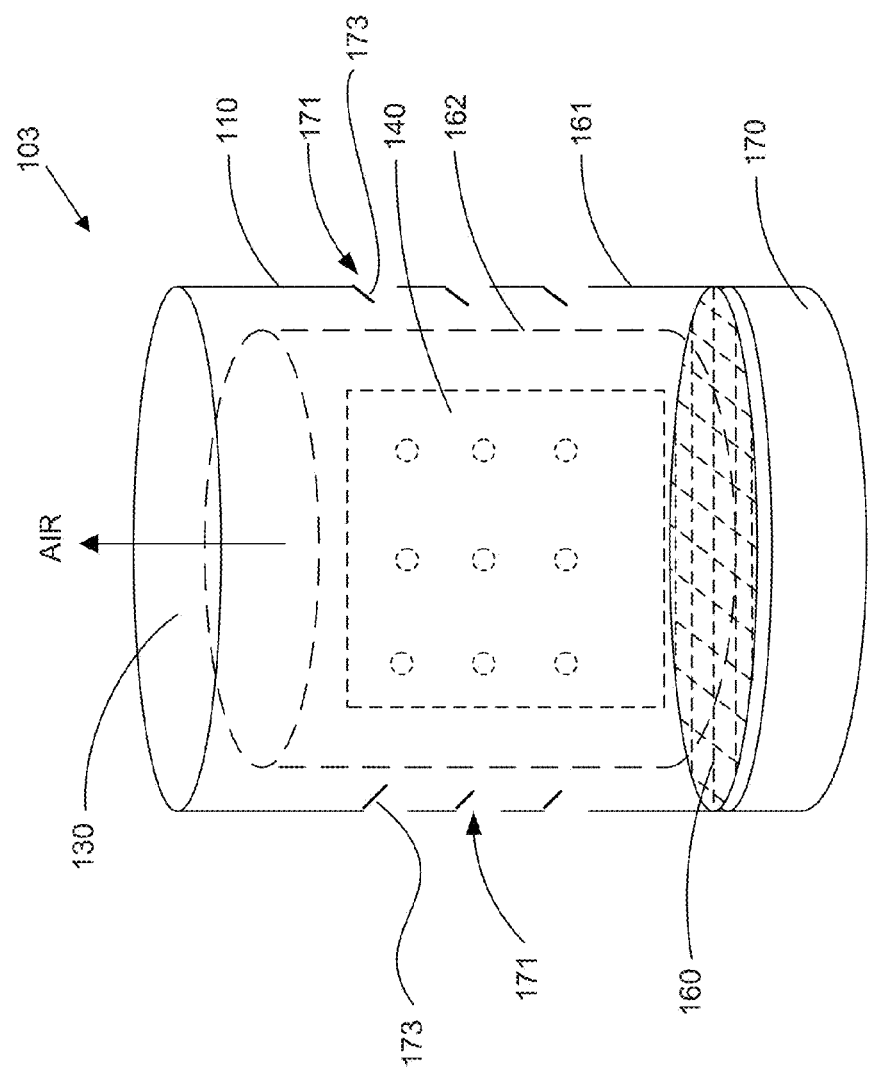
FIG. 9 illustrates an exemplary double-wall structure implemented in a system for water extraction from air consistent with the disclosed embodiments.

FIG. 9 illustrates an exemplary double-wall structure that may be implemented in system 103. In this embodiment, system 103 may include flanges 173 extending from openings 171 on outer wall 161. Flanges 173 may extend inwardly towards inner wall 162 from an upper edge of openings 171. When sponge 140 is compressed and when water is flowing out of inner wall 162 through openings 172, flanges 173 may prevent water from leaking out of system 103 through openings 171 on outer wall 161. Flanges 173 may be configured in such a way as to prevent water leakage, yet still allow free air flow. Although not shown in FIG. 9, one skilled in the art will appreciate that inner wall 162 may also include similar flanges at openings 172.

Figure 10:
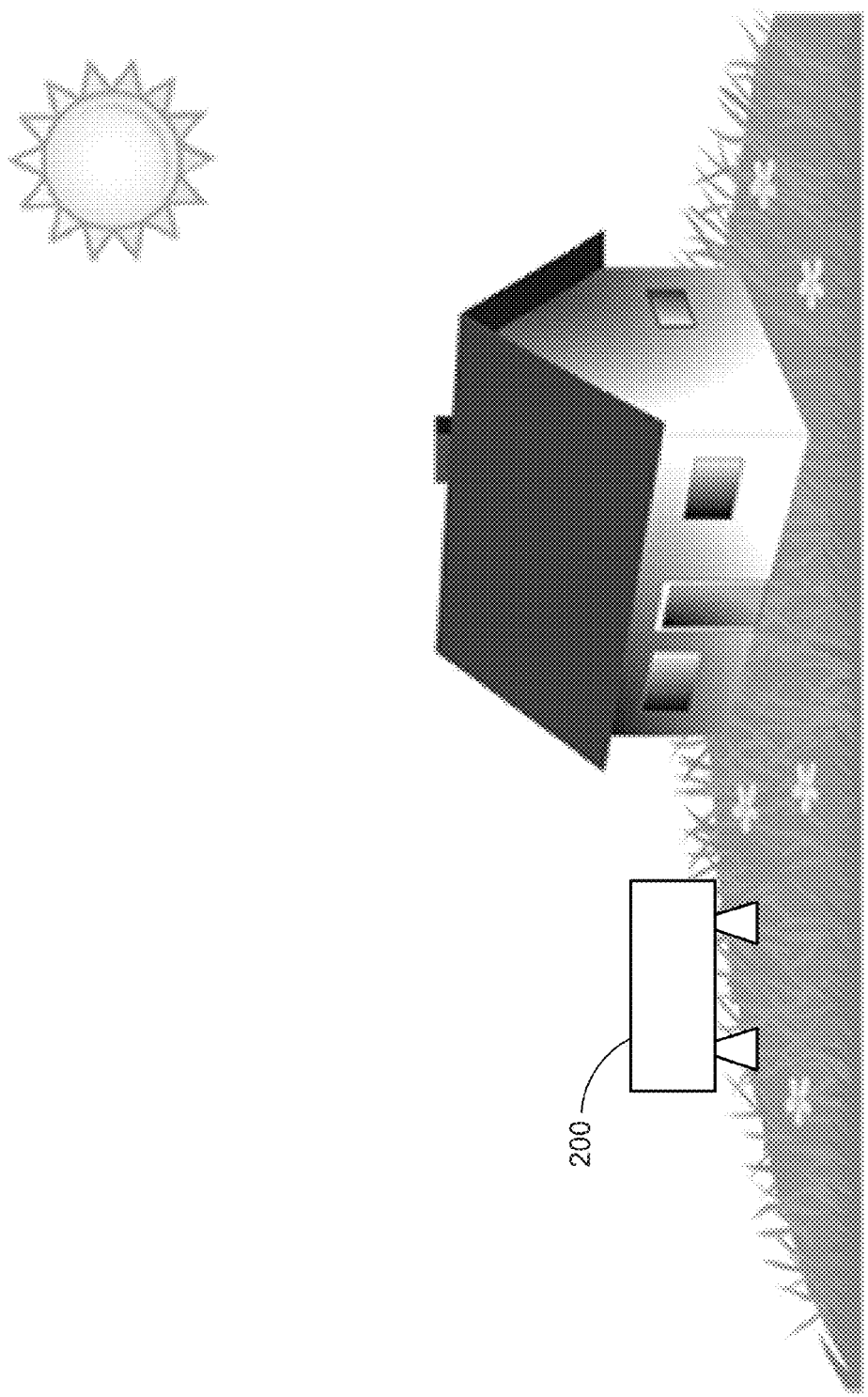
FIG. 10 illustrates an exemplary application of a system for water extraction from air consistent with the disclosed embodiments.

FIG. 10 illustrates an exemplary application of a system for water extraction from air consistent with the disclosed embodiments. In such an application, a system 200 may have a relatively large volume for producing a relatively large amount of water, as compared to systems 100-103. System 200 may fixed on a farm for extracting water from air for feeding people and animals. In some embodiments, system 200 may be rendered portable, e.g., by being mounted on a truck.

Figure 11:
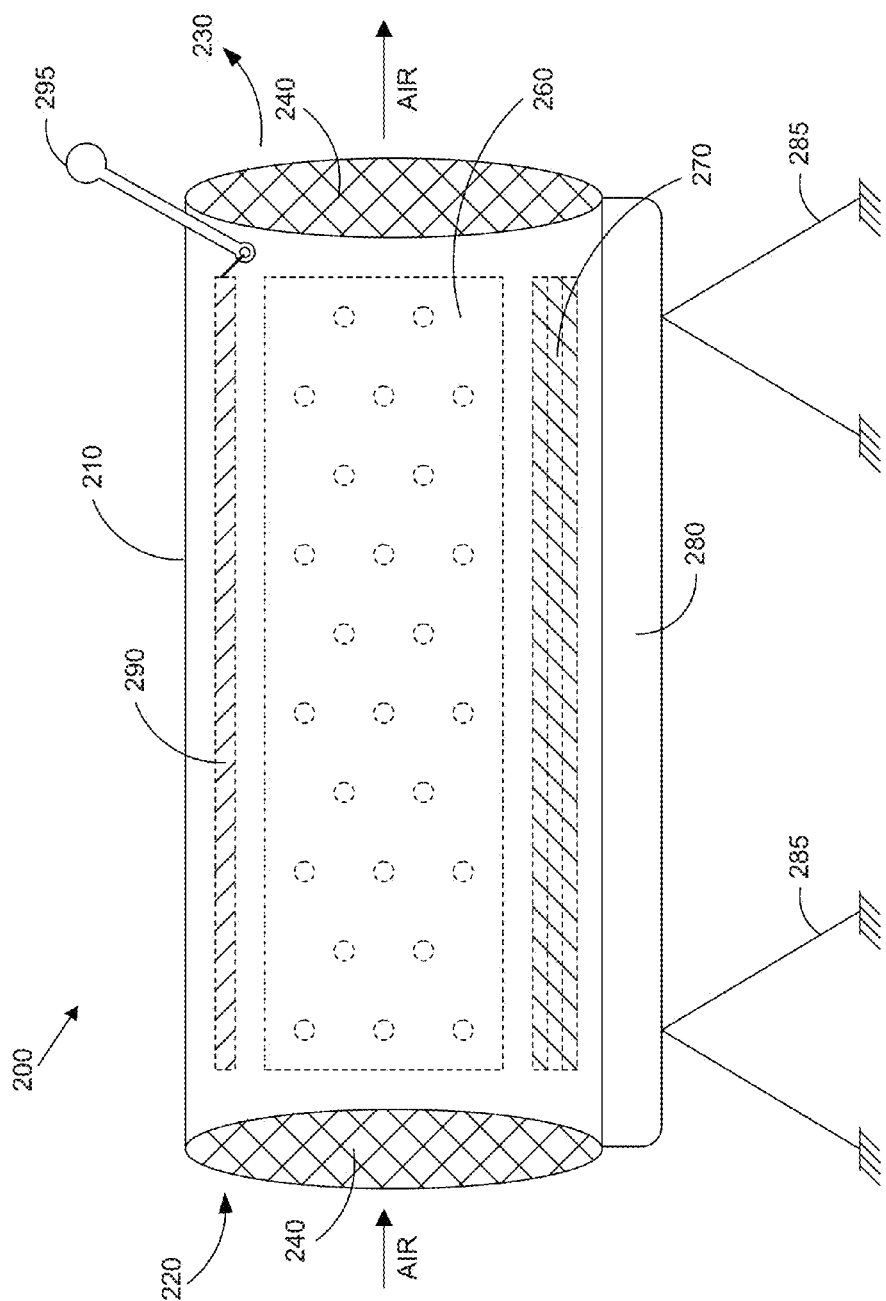
FIG. 11 illustrates an exemplary system for water extraction from air consistent with the disclosed embodiments.

FIG. 11 illustrates exemplary details of system 200. As shown in FIG. 11, system 200 may include a housing 210. Housing 210 may be made of any suitable material, such as plastic or metal. Similar to housing 110 and 111, housing 210 may include a thermal insulation feature, which may maintain the inner space defined by housing 210 at a relatively low temperature, or which may prevent the temperature inside the space defined by housing 210 from increasing to adversely affect the water extraction efficiency. For example, the outer surface of housing 210 may be coated with a highly reflective material, which may reflect heat away from housing 210. The inner surface of housing 210 may also include a suitable material that may help maintain a low temperature within the inner space defined by housing 210. Additional details of possible thermal regulating features are discussed above.

Housing 210 may include a longitudinally extended body having two open ends. In some embodiments, air may flow into and out of system 200 via the two open ends of housing 210. Air may flow into system 200 from either open end of housing 210. For example, air may flow into system 200 from opening 220, and flow out of system 200 from opening 230. Air may also flow in the reverse direction, i.e., in opening 230 and out opening 220.

System 200 may include an air filter 240 disposed at one or both of openings 220 and 230. System 200 may include a sponge 260 having a structure and property similar to those of sponge 140 discussed above. Sponge 260 may extract water vapor from air as air flows through sponge 260 and store extracted water therein. Although sponge 260 is shown in a single configuration, sponge 260 may have any of the features discussed above with respect to sponge 140.

System 200 may include a presser 290 configured to compress sponge 260 to discharge water from sponge 260. Presser 290 may be similar to presser 150 discussed above. Presser 290 may be driven by a handle 295 attached to housing 210. Handle 295 may be mechanically linked to presser 290 through any suitable mechanism, such as chains, gears, and springs. Handle 295 may be operable without any electrical power. A user of system 200 may actuate handle 295 by pulling down handle 295 to move presser 290 downward to compress sponge 260. The user may also move handle 295 to bring presser 290 back to its original position after water is discharged out of sponge 260.

System 200 may include a water filter 270 located below sponge 260. Water filter 270 may be similar to water filter 160 discussed above. Water discharged from sponge 260 may be filtered by water filter 270. Filtered water may flow into a water tank 280 located below water filter 270. Water tank 280 may be an integral part of housing 210, or may be a separate part that may be removed from and attached to housing 210. In some embodiments, system 200 may be fixed to a building or the ground through supports 285.

Figure 12:
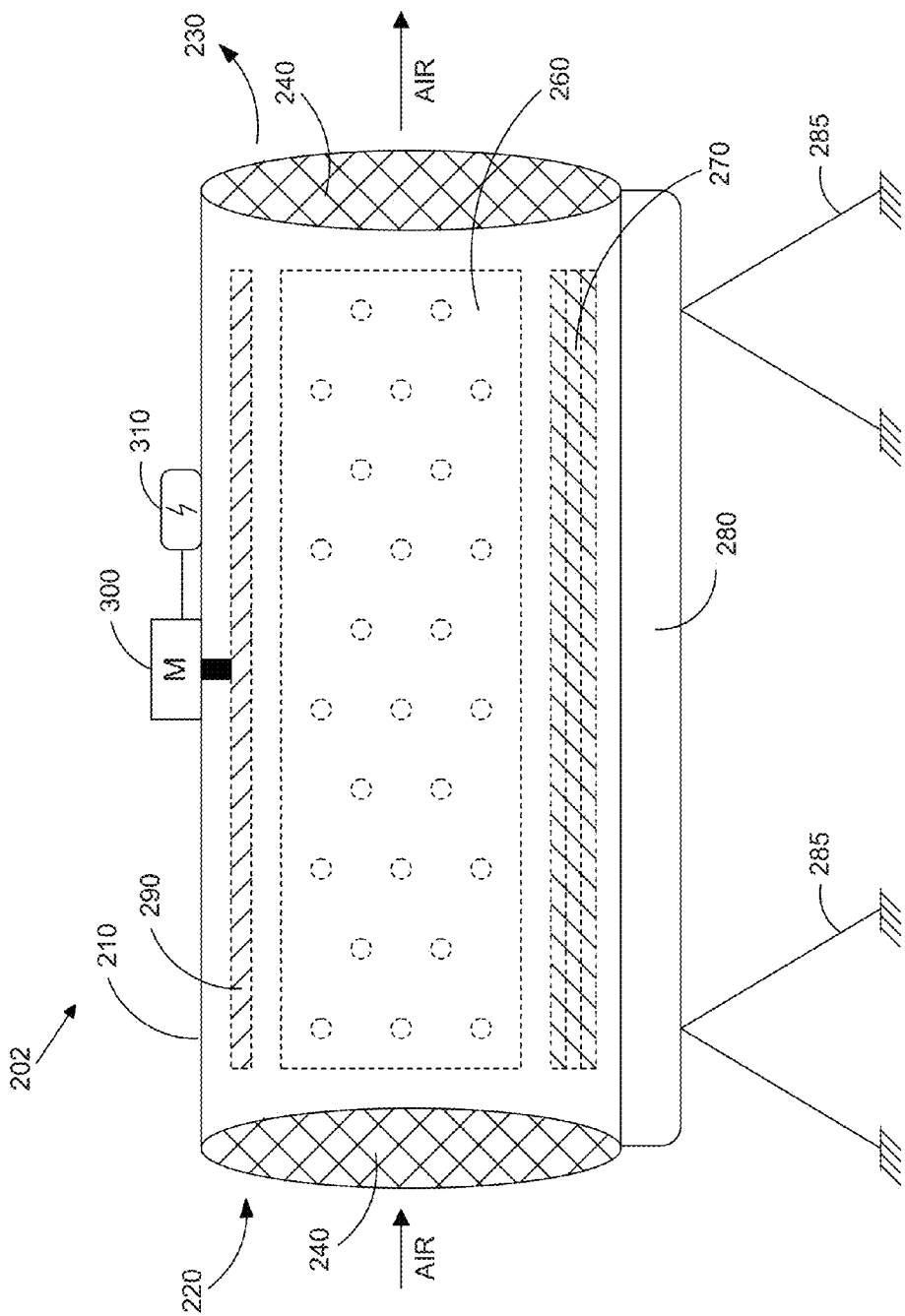
FIG. 12 illustrates an exemplary system for water extraction from air consistent with the disclosed embodiments.

FIG. 12 illustrates another exemplary system 202 for water extraction from air consistent with the disclosed embodiments. System 202 may include elements similar to those shown in system 200. The similar elements are labeled with the same numerical references as those included in system 200. Accordingly, the details of these similar elements may be referenced above.

In system 202, presser 290 may be driven by a motor 300, which may be powered by a battery 310. Motor 300 and battery 310 may be attached to housing 210 at suitable locations. Motor 300 may be linked with presser 290 through a suitable linking mechanism, such as a chain, a gear, or an extendable and extractable rod. When electrical power is supplied from battery 310 to motor 300, motor 300 may drive presser 290 towards sponge 260 to compress sponge 260. After water is discharged from sponge 260, motor 300 may bring presser 290 back to its original position.

Figure 13:
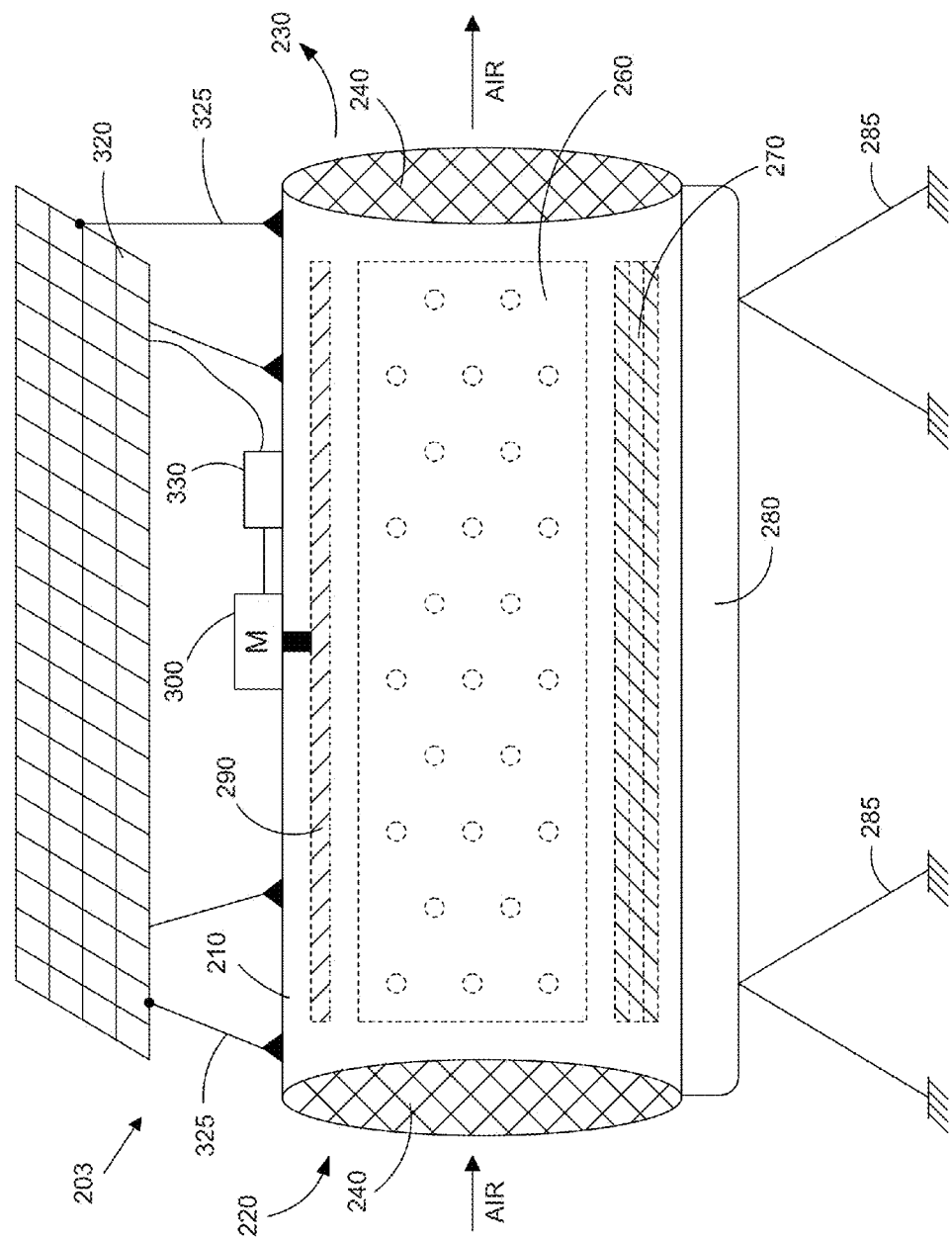
FIG. 13 illustrates an exemplary system for water extraction from air consistent with the disclosed embodiments.

FIG. 13 illustrates an exemplary system 203 for extracting water from air consistent with the disclosed embodiments. System 203 may include elements similar to those included in systems 200 and 202. These similar elements are labeled with the same numerical references as those in systems 200 and 202. The details of these similar elements may be referenced above.

In system 203, a presser 290 may be driven by a motor 300. Motor 300 may in turn be powered by a solar panel 320. Solar panel 320 may be attached to housing 210 through a fixture 325. Alternatively, solar panel 320 may be separate from housing 210. Solar panel 320 may convert solar energy into electrical energy, and may store electrical energy in a power storage device 330, such as a battery. Power storage device 330 may be electrically connected with motor 300 to supply electrical power to motor 300.

Figure 14:
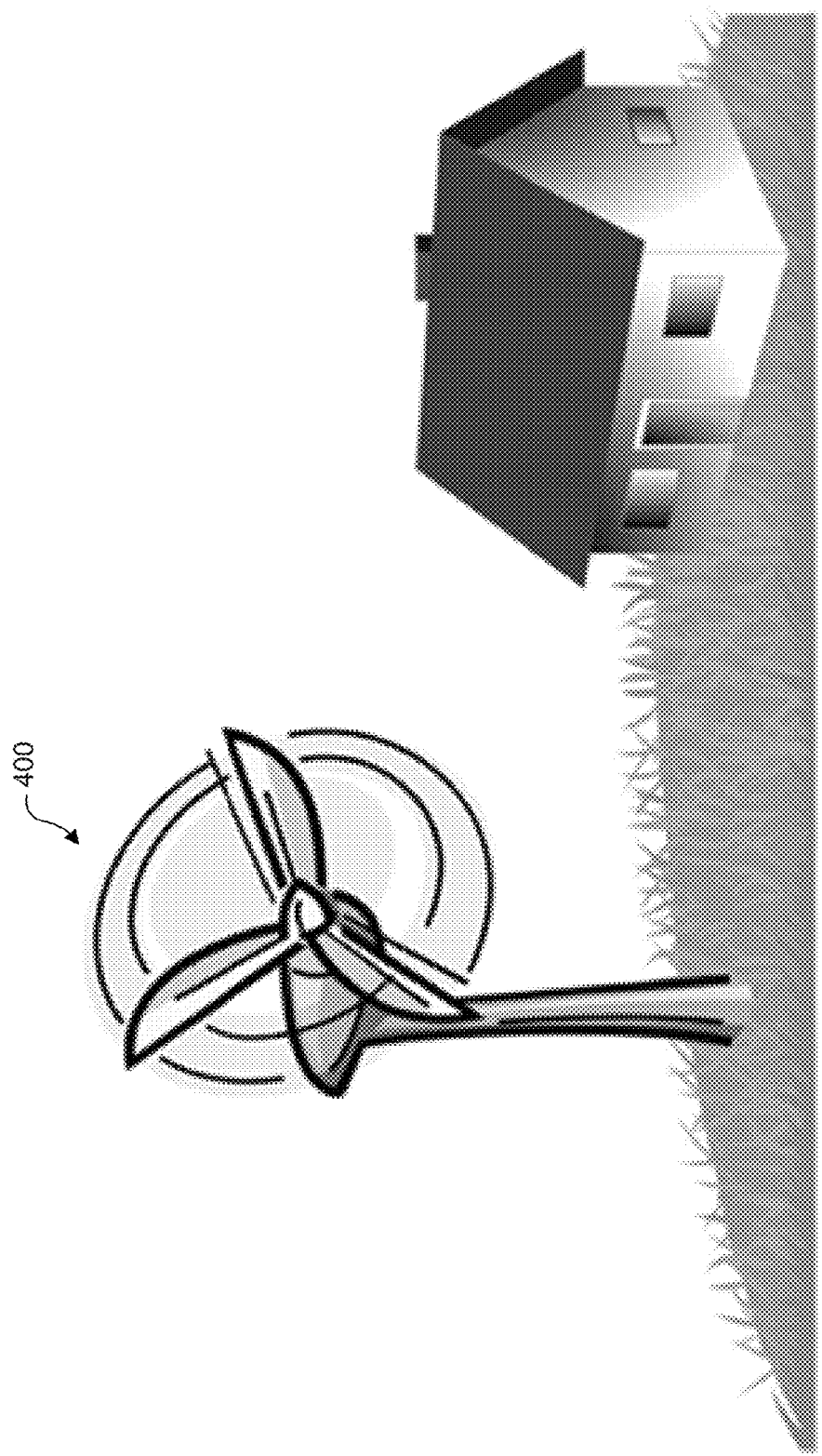
FIG. 14 illustrates an exemplary application of a system for water extraction from air consistent with the disclosed embodiments.

FIG. 14 illustrates another exemplary application of a system for water extraction from air. As shown in FIG. 14, a system 400 for extracting water from air may be integral with a windmill structure. System 400 may be used for generating electricity from wind power and, at the same time, extracting water from air. For example, system 400 may be disposed on a farm, adjacent a house, on an ocean island, or on a cruise ship to generate both electrical energy and potable water.

FIG. 15A illustrates further exemplary details of system 400. System 400 may include a windmill 410. Windmill 410 may include a plurality of blades 420. As wind blows through windmill 410, blades 420 may be driven by the wind to rotate, thereby converting wind energy into electrical energy through an energy converting unit included in the windmill 410 (not shown). Any type of energy converting unit known in the art may be suitable for use in system 400. System 400 may further include a ring shell structure 430 surrounding blades 420. Ring shell structure 430 may be attached to windmill 410 through supporting structures 440. At a bottom portion of ring shell structure 430, system 400 may include a water collector 450, which may be connected to a water tank 470 through a conduit 460.

The surface shape and area of blades 420 may be configured to provide, when rotating, a desired amount of air flow passing over fan blades 420. Thus, the goals of maximizing the speed of rotation for harvesting energy from the wind, and maximizing the blade surface area and wind flow thereover to promote extraction of water from the air, may be considered. The development of blade shapes may be facilitated using suitable design and/or simulation software and/or through experimentation.

Surfaces of blades 420 may include a water absorbing/adsorbing material. In some embodiments, at least a portion of blades 420 may be made of a water absorbing/adsorbing material. In some embodiments, part, or all, of each blade 420 may be made of a water absorbing/adsorbing material. In other embodiments, the surface of blades 420 may include a water absorbing/adsorbing material. For example, each of blades 420 may include a top layer that forms the surface, and the top layer may include a water absorbing/adsorbing material, such as a coating, laminate, etc. The water absorbing/adsorbing material may include any suitable material, for example, tertiary amines, polyethylene glycols, and/or hydrophobic activated carbons. As wind blows across the surfaces of blades 420, water vapor within the air may be extracted by the water absorbing/adsorbing material of blades 420.

As illustrated in FIG. 15B, water extracted from the air may attach to the surfaces of blades 420 in the form of water droplets 455. Water droplets 455 may grow as water accumulates on the surfaces of blades 420. In some embodiments, the surface of blades 420 may include a texture that facilitates the formation of water droplets thereon. When blades 420 rotate, water droplets 455 may be shed off the blades 420 due to the centrifugal forces caused by the rotation. Water droplets 455 shed off from blades 420 during rotation may be captured by ring shell structure 430, and may flow to the bottom position of ring shell structure 430. Water droplets 455 may be collected in water collector 450 located at the bottom position of ring shell structure 430. Water collected in water collector 450 may be further transported to water tank 470 for storage through conduit 460.

Figure 16:
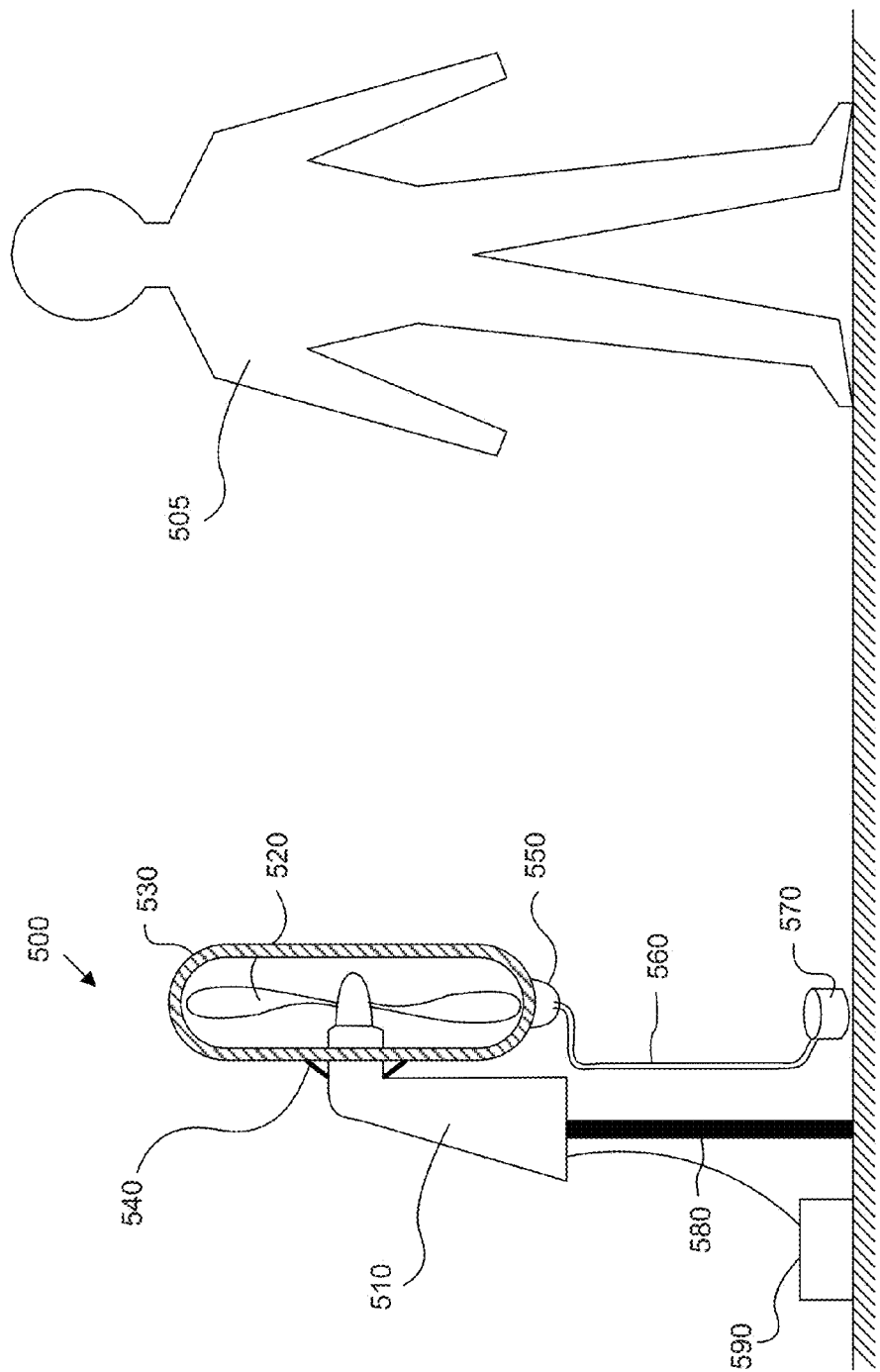
FIG. 16 illustrates an exemplary system for water extraction from air consistent with the disclosed embodiments.

FIG. 16 illustrates an exemplary system 500 for water extraction from air consistent with the disclosed embodiments. Rather than including a windmill, system 500 may include a fan 510. In some embodiments, fan 510 may be portable. Thus, in such embodiments, system 500 may be conveniently carried by an individual 505, such as a soldier or a traveler. Individual 505 may temporarily attach portable fan 510 to a structure erected on the ground, such as a post 580. In some embodiments, fan 510 may be fixed, e.g., to a building structure.

System 500 may include a plurality of blades 520 and a ring shell structure 530. Ring shell structure 530 may be attached to fan 510 through a plurality of supporting structures 540.

System 500 may include a water collector 550 located at a bottom position of ring shell structure 530. Water collector 550 may be connected with a water tank 570 through a conduit 560. System 500 may further include a power supply 590, such as a battery, connected with fan 510 for driving blades 520. Power supply 590 may supply electrical power to a motor (not shown), which may drive blades 520 to rotate.

In some embodiments, fan 510 may be operable to extract water from air even when not in use to blow air for a particular purpose. For example, in some embodiments, fan 510 may be passively spun by the wind, much like a windmill, except without the energy harvesting feature. In such embodiments, in order to sustain the water extraction action even during periods of minimal wind, power supply 590 may be configured to only supply power to drive blades 520 when the rotating speed of blades 520 is below a predetermined threshold speed. When blades 520 are rotating above the threshold speed, power supply 590 may remain inactive, allowing the wind to pass the air over blades 520 to facilitate the water extraction process.

Similar to blades 420 in system 400, blades 520 may include a water absorbing/adsorbing material. As wind blows across the surfaces of blades 520, water vapor may be extracted from the air by the water absorbing/adsorbing material. Water extracted from the air may form water droplets, which may attach to the surfaces of blades 520. In some embodiments, the surface of blades 520 may include a texture that facilitates the formation of water droplets thereon. As water droplets grow, they may be shed off from blades 520 due to the centrifugal forces. Water droplets shed off from blades 520 during rotation may be received by ring shell structure 530. Water droplets may flow to the bottom portion of ring shell structure 530, and may be collected by water collector 550. Water collected by water collector 550 may be further transported to water tank 570 for storage through conduit 560.

The disclosed systems for extracting water from air may have a wide variety of applications. For example, the disclosed systems may be carried by an individual, such as a soldier in a war zone, a traveler in a desert or a tropical forest. The disclosed system may also be carried by an automobile, a bike, or a ship. In some applications, the disclosed systems may also be employed on a farm, a sea shore, an off-shore oil rig, or a rooftop of a building. The disclosed systems may operate without any external power supply, may utilizes power supplied by a solar panel, and/or may require only small amount of power for operation.

It will be apparent to those skilled in the art that various modifications and variations can be made in the disclosed systems for extracting water from air. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A system for water extraction from air, comprising:
   a housing having two ends with one of the two ends serving as an air inlet allowing an air flow to enter into an inner space defined by the housing, and the other one of the two ends serving as an air outlet allowing the air flow to exit the housing;
   a sponge disposed within the inner space defined by the housing, the sponge including a water absorbing/adsorbing material for absorbing/adsorbing water vapor from the air flow; and
   a presser disposed above the sponge, the presser moving toward the sponge and compressing the sponge to discharge water from the sponge during a water extraction process.

2. The system of claim 1, further comprising:
   a handle attached to the housing and mechanically linked to the presser.

3. The system of claim 1, further comprising:
   a motor configured to drive the presser;
   a battery configured to provide electrical power to the motor.

4. The system of claim 1, further comprising:
   a motor configured to drive the presser;
   a solar panel configured to convert solar energy into electrical energy; and
   a power storage device configured to store electrical energy converted by the solar panel, and to supply electrical power to the motor.

5. The system of claim 1, further comprising:
   a water filter disposed below the sponge for filtering water discharged from the sponge.

6. The system of claim 5, further comprising:
   a water tank disposed below the water filter for storing water discharged from the sponge and filtered by the water filter.

7. The system of claim 1, wherein the presser has a web structure.

8. The system of claim 1, wherein the sponge has a block structure.

9. The system of claim 1, wherein the sponge has a layered structure including a plurality of layers.

10. The system of claim 1, wherein the sponge includes a plurality of fibers within a body of the sponge.

11. The system of claim 1, wherein:
    the sponge includes a ribbed, corrugated, or ridged surface.

12. The system of claim 1, wherein the inner space of the housing and the sponge extend longitudinally in the same direction between the ends of the housing.

13. A system for water extraction from air, comprising:
    a housing having an air inlet allowing an air flow to enter into an inner space defined by the housing, and an air outlet allowing the air flow to exit the housing;
    a sponge disposed within the inner space defined by the housing, the sponge including a water absorbing/adsorbing material for absorbing/adsorbing water vapor from the air flow;
    a presser disposed above the sponge and configured to compress the sponge to discharge water from the sponge; and
    a water tank disposed below the sponge for storing water discharged from the sponge due to compression of the sponge by the presser.

14. The system of claim 13, further comprising:
    a handle attached to the housing and mechanically linked to the presser.

15. The system of claim 13, further comprising:
    a motor configured to drive the presser;
    a battery configured to provide electrical power to the motor.

16. The system of claim 13, further comprising:
    a motor configured to drive the presser;
    a solar panel configured to convert solar energy into electrical energy; and
    a power storage device configured to store electrical energy converted by the solar panel, and to supply electrical power to the motor.

17. The system of claim 13, further comprising:
a water filter disposed between the sponge and the water tank for filtering water discharged from the sponge.

18. The system of claim 13, wherein the housing includes a longitudinally extending body having two open ends forming the air inlet and the air outlet.

19. The system of claim 13, wherein at least one of an area of the air inlet and an area of the air outlet is larger than a cross-sectional area of the sponge.

20. A system for water extraction from air, comprising:
a housing having two ends comprising an air inlet and air outlet;
a sponge disposed within the inner space defined by the housing, comprising a water absorbing/adsorbing material for absorbing/adsorbing water vapor from the air flow; and
a presser disposed above the sponge and configured to compress the sponge to discharge water from the sponge,
wherein at least one of an area of the air inlet and an area of the air outlet is larger than a cross-sectional area of the sponge.

* * * * *